United States Patent [19]
Abileah

[11] Patent Number: 6,111,622
[45] Date of Patent: Aug. 29, 2000

[54] DAY/NIGHT BACKLIGHT FOR A LIQUID CRYSTAL DISPLAY

[75] Inventor: Adiel Abileah, Farmington Hills, Mich.

[73] Assignee: OIS Optical Imaging Systems, Inc., Troy, Mich.

[21] Appl. No.: 08/177,858

[22] Filed: Jan. 5, 1994

Related U.S. Application Data

[63] Continuation-in-part of application No. 08/031,120, Mar. 12, 1993, abandoned.

[51] Int. Cl.$^7$ .............................. G02F 1/1335; F21V 7/04
[52] U.S. Cl. .............................. 349/61; 349/62; 349/106; 362/31
[58] Field of Search ................................. 359/40, 48, 49, 359/68; 349/5, 6, 61, 62, 67, 106; 362/31, 32

[56] References Cited

U.S. PATENT DOCUMENTS

| | | | |
|---|---|---|---|
| 4,171,874 | 10/1979 | Bigelow et al. | 359/49 |
| 4,456,336 | 6/1984 | Chung et al. | 359/70 |
| 4,580,877 | 4/1986 | Washo | 359/48 |
| 4,616,295 | 10/1986 | Jewell et al. | 362/31 |
| 4,660,936 | 4/1987 | Nosker | 359/48 |
| 4,704,004 | 11/1987 | Nosker | 359/49 |
| 4,768,096 | 8/1988 | Cannella et al. | 358/294 |
| 4,798,448 | 1/1989 | Van Raalte | 359/49 |
| 4,874,228 | 10/1989 | Aho et al. | 359/49 |
| 4,915,479 | 4/1990 | Clarke | 359/42 |
| 4,934,793 | 6/1990 | Klein | 359/49 |
| 4,936,659 | 6/1990 | Anderson et al. | 359/69 |
| 4,984,872 | 1/1991 | Vick | 359/49 |
| 5,040,878 | 8/1991 | Eichenlaub | 359/49 |
| 5,046,826 | 9/1991 | Iwamoto et al. | 359/49 |
| 5,050,946 | 9/1991 | Hathaway et al. | 359/48 |
| 5,121,234 | 6/1992 | Kucera | 359/48 |
| 5,128,783 | 7/1992 | Abileah et al. | 359/49 |
| 5,143,433 | 9/1992 | Farrell | 359/50 |
| 5,161,041 | 11/1992 | Abileah et al. | 359/40 |
| 5,211,463 | 5/1993 | Kalmanash | 362/26 |
| 5,262,880 | 11/1993 | Abileah | 359/40 |

FOREIGN PATENT DOCUMENTS

| | | |
|---|---|---|
| 0030875 | 6/1981 | European Pat. Off. . |
| 54-66862 | 5/1979 | Japan . |
| 63-110422 | 5/1988 | Japan . |
| 4-037718 | 2/1992 | Japan . |
| 4-225324 | 8/1992 | Japan . |
| 2198867 | 6/1988 | United Kingdom . |

OTHER PUBLICATIONS

"A Full Color AMLCD with NVG Class B Compatibility," Abileah et al, 1992, IEEE, pp. 1237–1241.
"Full Color Display with Amorphous Silicon Pin Diodes" Abileah et al, 1989, SPIE vol. 1080, pp. 174–182.

(List continued on next page.)

Primary Examiner—William L. Sikes
Assistant Examiner—Toan Ton
Attorney, Agent, or Firm—Jeffrey H. Canfield; Laff Whitesel & Saret, Ltd.

[57] ABSTRACT

A backlit liquid crystal display device having improved nighttime operational characteristics includes a fluorescent lamp for daytime operation and a separate light source for nighttime operation which emits a low-intensity light. Preferably, the nighttime light source is an electroluminescent panel which also acts as a daytime reflector of light. An integral image-splitting and collimating lens is provided to increase the uniformity of the light emitted and to provide wide angle viewability. A sharp cut-off IR filter may also be included in the device to provide NVIS-B night vision goggle compatibility.

8 Claims, 7 Drawing Sheets

OTHER PUBLICATIONS

"Performance of Full Color Active–Matrix–LCD" Abileah et al., 1989, SPIE vol. 1117, pp. 131–142.

"8×8 Full Color Cockpit Display", Robbins et al, Sep. 1990, IEEE AES Magazine, vol. 5, No. 9, pp. 3–6.

"3M Scotch™ Optical Lighting Film Application Bulletin", Sherman, Nov. 1988.

"3M Scotch™ Optical Lighting Film General Theory", Sherman, Nov. 1988.

"Polarized Backlight for Liquid Crystal Display", IBM Technical Disclosure Bulletin, vol. 33, No. IB, Jun. 1990, pp. 143–144.

Military Standard MIL–L–85762A, Aug. 26, 1988.

"Durel™ Electroluminescent Lamps", Rogers Corp., Oct. 1987.

"Loctite Luminescent Systems, Inc.", 1990.

"3M/Optical Systems Right Angle Backlighting Technology Design Aid" (1991).

Abileah et al, "Practical Aspects of AMLCD Application".

"Electroluminescent Lighting", NEC Corporation.

"Perma–light™ Solid–State Electroluminescent Lamps", The Quantex Corp.

DAY/NIGHT BACKLIGHT FOR A LIQUID CRYSTAL DISPLAY

This is a continuation-in-part of Ser. No. 08/031,120, filed Mar. 12, 1993, now abandoned.

BACKGROUND OF THE INVENTION

This invention relates to backlit liquid crystal display devices (LCDs) having a first light source for operation during the day, and a separate and independent second light source for operation at night.

LCDs are gaining in popularity for use in systems such as television receivers, computer monitors, avionic displays, aerospace displays, and other military-related displays, where the elimination of cathode ray tube technology is desirable for several reasons. In particular, cathode ray tubes are characterized by large depth dimensions, inordinately high weight and extreme fragility. Additionally, cathode ray tubes require a relatively high voltage power supply in order to sufficiently accelerate the electron beam, and thus sustain the displayed image.

The aforementioned shortcomings of cathode ray tubes (CRTs) are overcome by the flat panel liquid crystal display in which a matrix array of liquid crystal picture elements or pixels are arranged in a plurality of rows and columns. Patterns of information are thereby defined by the two-dimensional array of pixels which, because of differences in the orientation of the liquid crystal material within each pixel, are caused to appear either darkened or transparent.

Liquid crystal displays may be either transflective or transmissive. Transflective displays depend upon ambient light conditions in order to be viewed, i.e. light from the surrounding environment, incident upon the side of the display facing the viewer, is reflected back to the viewer. Transflective liquid crystal displays cannot, therefore, be used in a dark or low light environment, since there is no light available for reflection off the viewing surface of the display.

Conversely, transmissive liquid crystal displays require the use of illuminating means, such as a tubular fluorescent lamp array operatively disposed on the side of the matrix array of pixels opposite the viewer. This illumination means, or backlight, may also include a back reflector adapted to efficiently redirect any stray illumination towards the matrix array of rows and columns of picture elements, thus ensuring that the displayed image is as bright as possible (given the characteristics of the lighting scheme employed).

In the past, a great deal of research in the field of flat panel liquid crystal display devices has been dedicated to the design of backlighting schemes which optimize viewing and structural parameters of those displays. Particularly, uniformity and intensity of light across the illuminated area has been maximized while maintaining low power consumption and a low overall profile, i.e., a thin assembly.

For example, as disclosed in the commonly assigned U.S. Pat. No. 5,161,041, the entire disclosure of which is incorporated herein by reference, integral image splitting and collimating means operatively disposed between the light source and the rows and columns of liquid crystal picture elements was employed. This integral image splitting and collimating means has the advantages of providing a bright, uniform light to the matrix array of pixels, while maintaining a narrow profile and minimizing the power consumption of prior backlit electronic displays. This bright, uniform light achieves a high contrast display in bright ambient light conditions.

The effect of the integral image-splitting and collimating means is to eliminate local bright spots and pale spots in the display, corresponding, respectively, to the legs and the spaces between the legs of a typical fluorescent lamp, by providing two similar images of the light emanating from each lamp leg. By locating the split images contiguous, one to each other, the area of illumination is effectively enlarged, and a bright, uniform light distribution across a low profile LCD is obtained. In addition to image-splitting, the specific integral image-splitting and collimating means employed in the aforementioned patent provided collimated light. Additionally, when a light diffuser is provided between the integral image-splitter/collimator and the matrix array, wide angle viewability is also achieved. The precise diffuser chosen depends on the application of the LCD.

In preferred forms of the invention U.S. Pat. No. 5,161,041, the integral collimating and image-splitting means included a thin film having light-refracting, faceted prisms formed on one of its faces. An example of such a film is 3M SCOTCH™ Optical Lighting Film. In preferred forms, this thin 3M SCOTCH™ film is used by laminating it to a clear transparent sheet of glass, ceramic or plastic, and thereafter using it as a layer in a low profile LCD stack.

While the above-mentioned U.S. patent improved the profile and optical characteristics of prior art electronic displays, and also improved lighting efficiencies so as to reduce the power consumption of the displays, that application did not deal with the problem associated with the use of such displays at nighttime, when very low light intensities are desirable. In particular, known devices utilize tubular fluorescent lamps to provide the high intensity light required for high contrast color liquid crystal displays used during daylight operation where high ambient light conditions exist, e.g., for avionic applications. However, when dimmed to the low intensity levels required for nighttime use, fluorescent lamps loose stability and uniformity. Loss of stability is used herein to mean that the fluorescent lamps begin to flicker. Loss of uniformity is used herein to mean that light and dark bands appear along the fluorescent lamp.

Other research regarding the use of LCDs has concentrated on their use when the viewer is wearing night vision goggles (NVG). NVGs are designed to detect infrared light and are used typically in very low levels of light. The major problem associated with the use of NVGs occurs when stray light, and particularly stray infrared light, is reflected into the NVG, saturating it. The stray light often comes from displays and panel equipment and reflections of the light therefrom.

Night vision goggles operate because of their high sensitivity to very low levels of light, mainly in the near infrared (IR) region of the spectrum (i.e. about 630–1100 nm). Efforts to block the IR region of the displays and panel equipment were unsuccessful because color integrity (particularly of the color red) and the ability to view the LCD at reasonably wide angles from normal (e.g. up to about 60°) could not be achieved. The new sharp cutoff IR filter of my commonly-assigned, co-pending U.S. patent application Ser. No. 925,193, (filed Aug. 6, 1992 and entitled "Night Vision Goggle Compatible Liquid Crystal Display Device", the disclosure of which is incorporated herein by reference) provided a solution to these problems. This new filter is successful because, while it does cut off the IR region of the spectrum, it does not cut off a portion of the visible red light resulting in an unbalanced white color, and a shifting of the red color towards the orange. The resulting display thus can pass the NVIS-B criteria of Military Standard MIL-L-85762A. Additionally, by combining the new sharp cutoff IR filter of U.S. patent application Ser. No. 925,193 with the integral image-splitting and collimating means of U.S. Pat. No. 5,161,041, reasonably wide viewing angles may also be achieved.

U.S. Pat. No. 5,143,433 discloses a night vision compatible backlighting system for a liquid crystal display, including a first group of light sources for activation during the day and a second group of light sources for activation at night. In the preferred embodiments of this patent the nighttime light sources are positioned directly behind the daytime light sources whereby the daytime light sources are disposed directly between the display panel and the nighttime sources. Therefore, the light from the nighttime light sources must pass through the daytime lamps, being diffused thereby, before reaching the active matrix display panel.

U.S. Pat. No. 5,143,433 further states that if the nighttime lamps are arrayed and located not to reside directly behind the existing daytime lamp tubes, the use of a diffusing plate can be used as may be necessary. In such a case, the diffusion plate may be located either at the liquid crystal display or just above the low level intensity nighttime lamps.

A problem associated with the daytime/nighttime liquid crystal display backlighting system of U.S. Pat. No. 5,143,433 is that the daytime bulbs or lamps often have characteristics (i.e. thickness, coatings, etc.) which prohibit them from satisfactorily diffusing the light emitted from the nighttime sources, thus, resulting in erratically diffused low intensity light at nighttime giving rise to local bright spots and pale spots in the display. Furthermore, U.S. Pat. No. 5,143,433 while discussing the location of the nighttime light sources not directly behind the daytime sources, does not illustrate or disclose how such a system could be arranged or practiced. Also, the device of the aforesaid patent, while providing separate daytime and nighttime light sources, requires an increased depth or profile of the display due to the presence of both the separate backlights and the daytime reflector.

While the aforesaid prior art teaches the use of a liquid crystal display backlighting system including both nighttime and daytime light sources, the prior art does not teach or suggest how to practice such an invention such that the light emitted from both the daytime and nighttime light sources is split into two similar images thereof which are cojoined to create a substantially uniform generation of light for impingement upon the rear side of the liquid crystal matrix array while maintaining a display with a low profile or depth.

As will be discussed more fully below, the instant invention provides solutions to the above-described problems of the prior art, and improves the compatibility of LCDs with NVGs.

SUMMARY OF THE INVENTION

Generally speaking, this invention fulfills the above-described needs in the art by providing in a liquid crystal display which includes a matrix array of rows and columns of liquid crystal picture elements, the matrix array having a viewing side and a rear side, and wherein the display further includes means for generating light to be passed through the matrix array which includes a first light source and a second light source, the first and second light sources being located rearward of the rear side of the matrix array thereby to create a pair of backlit light sources for the array, the means for generating light further including means for selecting from which light source the light shall be emitted, the improvement comprising: as the first light source, at least two, spaced apart light emitting members of substantially the same size so as to define a gap therebetween, the two spaced apart light emitting members each have an inner diameter defining an inner periphery and an outer diameter defining an outer periphery thereof; wherein the gap is defined as the distance between the inner peripheries of the two spaced apart light emitting members, the gap being of substantially the same width as each of the inner diameters of the spaced apart light emitting members; wherein the second light source is located rearward of the first light source with respect to the matrix array, and is further so located with respect to the first light source such that a substantial portion of the light emitted from the second light source directly projects into and through the gap between the inner peripheries of the two spaced apart light emitting members of the first light source; and wherein the display further includes image splitting means for providing two, similar images of one of the first and second light sources when the one light source emits light therefrom, the image splitting means being located between the matrix array and the light sources and being spaced from the light sources such that when the first light source emits light the split, similar images thereof formed by the image splitting means are cojoined to create a substantially uniform generation of light for impingement upon the rear side of the matrix array, and such that when the second light source emits light, the split images thereof formed by the image splitting means are cojoined to create a substantially uniform generation of light for impingement upon the rear side of the matrix array.

In certain preferred embodiments of the present invention, an infrared light absorbing filter is included in the LCD stack. The infrared filter is capable of preventing substantially all infrared light from being emitted from the display while at the same time transmitting substantially all red light therethrough, thereby to maintain the color integrity of the image of the display, and is spacedly disposed between the integral collimating and image-splitting means and the diffuser.

In certain further preferred embodiments of this invention, the infrared light-absorbing filter is repositioned within the LCD stack between the two light sources. This embodiment has the advantage of preventing substantially all infrared light from being emitted from the display in nighttime operation while transmitting the maximum amount of light during daytime operation.

This invention further fulfills the above-described needs in the art by providing in a backlit liquid crystal display which includes: a first source of light for operation during a day mode; a matrix array of rows and columns of liquid crystal picture elements spacedly disposed from one side of the first light source wherein each liquid crystal picture element comprises a pair of electrodes having liquid crystal material disposed therebetween; means for refracting light rays emanating from the first light source to provide two similar images thereof, thereby enlarging the area effectively illuminated by the first light source, whereby a bright, uniform distribution is provided in a low profile assembly, the refracting means spacedly disposed between the first light source and the matrix array; and means for diffusing light emanating from the first light source operatively disposed between the refracting means and the matrix array, the improvement comprising: a second source of light for night mode operation, spacedly disposed on the side of the first source of light opposite the matrix array, and switch means for selecting between the first and second light sources; and wherein the color integrity of the displayed image is maintained throughout a viewing angle of about 0°–30° from normal.

The terms "substantially all infrared light" and "substantially all red light" are used herein together to mean that the filter employed is one which creates a reasonably sharp cutoff between the near IR and red spectrum. An example of a filter with an unacceptable cutoff is reported in Abileah et al., "A Full Color AMLCD with NVG Class B Compatibility" IEEE, AES Magazine (March, 1992) pp. 1237 thru 1241, in FIG. 2, p. 1238. The result, as shown in FIG. 1, curve (2) of that article, is an unbalanced white color and a shift of the red color toward orange. An example of a filter with an acceptable, reasonably sharp cutoff is shown in FIG. 3, p. 1239 of that article. Such a filter, which only achieves a truly sharp cutoff for incident light at angles normal to its surface, may be obtained from WAMCO Corp. (California, U.S.A.) as a "Wamco Night Vision Filter", and has the SPECTRAL TABLE given in the aforementioned co-pending U.S. patent application Ser. No. 925,193.

The term "low profile" is used herein in accordance with its well-known meaning in the art. Generally speaking, this term refers to an LCD which, through its thinness, does not take up inordinate space, often a critical characteristic or requirement to be met in avionics and aerospace vehicles. The term "low profile" may be defined by the term "LCD thickness". "LCD thickness" is herein defined as overall display thickness including the matrix array, optics, backlight, ballast and dimming circuitry (e.g. when the elements of FIG. 1 are assembled together in an outside box, not shown). To be a "low profile" LCD, its LCD thickness should be less than about 2 inches, while the backlight assembly thickness (e.g., elements 2, 3, 4, 5, 7 and IRF of FIG. 1) is preferably about 1.5 inches or less.

Preferred embodiments of this invention exhibit improved red color coordinates as stated above. In practice, the NVG capability (i.e. compatibility) of these preferred LCDs is tested using the criteria of the MIL-L-85762A Standard for color displays with 0.5 fl intensity. This Standard requires that at all points of the display and at the useful viewing angles for that display, an NRb of less than or equal to 2.2E-09 is exhibited. Certain embodiments as contemplated by this invention conform to the requirements of this Standard. For example, in some embodiments, the numbers at the normal angle at the center of the display will meet the Standard (e.g. NRb=about 2.094E-09), while the numbers near the edges of the display (e.g. NRb=about 8.120E-10) substantially exceed the requirements of the Standard. Exemplary of such numbers are, again, shown in the aforesaid Abileah et al. article, FIGS. 6A and 5B. MIL-L-85762A is incorporated herein by reference.

This invention will now be described with respect to certain embodiments thereof, as illustrated in the following drawings, wherein:

DETAILED DESCRIPTION OF THE INVENTION

Figure 1:
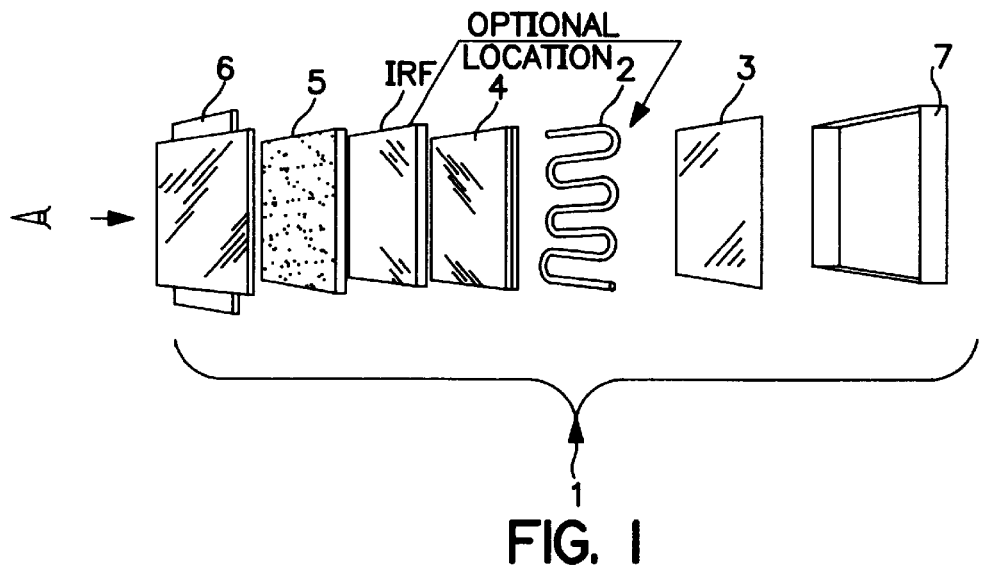
FIG. 1 is an exploded, perspective view illustrating an embodiment of the subject invention such as might be used in military and avionic applications.

It is to be understood that active matrix liquid crystal displays, which operate in full color and in the transmissive mode, represent the primary choice of flat panel technologies for avionic and military applications because of their sunlight readability, high resolution, color and gray scale capability, low power consumption and thin profile. It is to be specifically noted, however, that while an active matrix liquid crystal display will be described in detail hereinafter as a preferred embodiment, the instant invention can be used with equal advantage in any type of backlit electronic display known to those skilled in the art, for both daytime and nighttime use and in which infrared light emissions may be prohibited or may need to be significantly diminished.

Generally speaking, in order for electronic displays to gain increased acceptance in military and avionic applications, the backlighting of flat panel displays, and particularly active matrix liquid crystal displays, must be improved in light efficiency and reliability. In order for a full color liquid crystal display to possess acceptable contrast under high ambient lighting conditions, e.g. daytime, and because the twisted nematic liquid crystal material, polarizers and color filters result in a display panel which transmits only about 4%–5% of the incident radiation, the backlighting arrangement must be bright. However, for a liquid crystal display to operate acceptably in low ambient lighting conditions, the backlighting assembly must be able to operate over a large range of intensities. Typically, the bright fluorescent lamps employed in LCDs, which provide acceptable daytime operation, must have dimming ratios of approximately 2000:1 to provide acceptable nighttime illumination. However, when fluorescent lamps are dimmed over such a large range, the result is a non-uniform and unstable light. In other words, the fluorescent lamp flickers and develops light and dark bands.

The daytime backlight assembly of the instant invention, like that of the aforesaid commonly assigned U.S. Pat. No. 5,161,041 and the co-pending application Ser. No. 07/925,193, consumes only about 1.2 watts/square inch of power with a depth dimension of only about one inch. This design increases lamp life, a critical parameter in the design and successful marketing of electronic displays, to approximately 8,000 hours or more from the typical values of about 4,000 hours exhibited by known prior art lighting arrangements. However, the backlight assembly of the commonly assigned patent and co-pending patent application still requires a very large dimming range for nighttime operation. Therefore, the present invention adds a second light source for nighttime operation which does not need to be dimmed over such large ranges.

Almost all backlighting assemblies designed for active and passive matrix liquid crystal display applications have the same basic components. More specifically, each backlighting assembly usually includes a light source, an optional optical system comprising one or more lenses for altering the nature of the light emanating from the light source, a diffusing material to enable visibility from a wide range of viewing angles, a back reflector to redirect light from behind the backlight lamps toward the matrix of liquid crystal elements, and light source control electronics (ballast).

An exploded perspective view of the first embodiment of a fluorescent lamp-based backlight assembly of the present invention is illustrated in FIG. 1. The backlight assembly depicted therein is represented generally by reference numeral 1, and as is typical in the industry, employs tubular fluorescent lamp 2 as the daytime light source. Of course, lamp 2 may be arranged in any one of a plurality of well-known configurations: it may be serpentined as shown in FIG. 1, it may be "U-shaped", or it may be straight. Other alternative lamp configurations may comprise two lamps interleaved in a serpentined configuration or in a square helical configuration. With the exception of the square helical design, the legs of the lamp should be positioned to extend horizontally with respect to the viewer in order to provide the desired optical effect of restricting the light to a vertical cone, as discussed in greater detail below. A critical parameter of lamp 2, regardless of the configuration of the lamp employed, is the spacing between the legs of the lamp which will be more fully discussed below.

With further reference to FIG. 1, the backlight system further includes nighttime EL light source 3, integral image-splitting/collimating lens 4, diffuser 5, matrix display panel 6, and infrared filter IRF. The backlight system also includes a ballast 7 and conventional lamp control electronics (not shown) having provisions for selectively turning on and off both the nighttime light source 3 and the daytime light source(s). Also shown in FIG. 1 is an optional location for filter IRF which will be discussed in greater detail below. Display panel 6 comprises a plurality of rows and columns of liquid crystal picture elements (pixels) adapted to be illuminated by high intensity daytime lamp 2 and nighttime EL light source 3.

Prior to the advent of the instant invention, LCD backlighting systems included a back reflector in the position where nighttime light source 3 has been placed. The purpose of a back reflector is to redirect light which is not initially directed towards the display element, so that the maximum amount of available light is directed towards display panel 6. Therefore, a special feature of nighttime light source 3 is the capability to act as both a daytime reflector of light emitted from the daytime light source 2 and an emitter of light at night.

Generally speaking, the integral image-splitting/collimating lens 4 is provided to alter or enhance the uniformity and quality of the light emanating from both the daytime and nighttime light sources. Lens 4 includes image-splitting and collimating means which enhances the quality and uniformity of the light incident on display panel 6. The light from daytime lamp 2 and nighttime EL source 3 is enhanced by the image-splitting means of lens 4, i.e. it is made to appear more uniform across the face of the display, by splitting the image of the light into two images. Without the image-splitting means of lens 4, the light from the day mode lamp 2 would appear, to the observer of the display, as local bright and pale spots corresponding to the legs and the spaces between the legs of daytime lamp 2. Similarly, the same effect is observed when nighttime EL source 3 is turned on and daytime lamp 2 is turned off, because daytime lamp 2 blocks portions of light emitted by nighttime source 3. By splitting the images of both the daytime and nighttime light, the pale spots are effectively filled in.

Figure 2A:
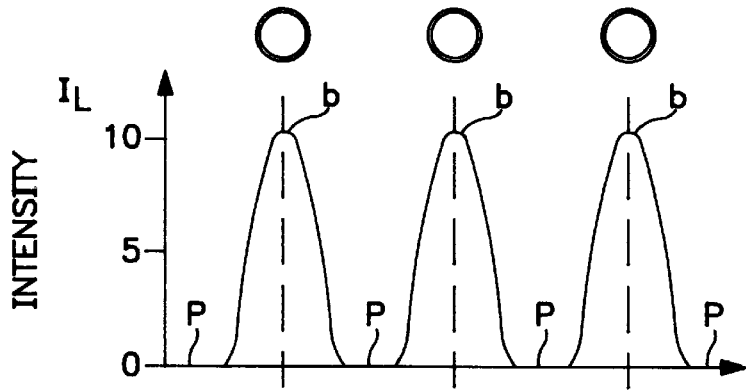
FIG. 2A is a graph of the lamp light intensity distribution in which the intensity of illumination is plotted on the ordinate, and the horizontal position across the viewing surface of an electronic display (not incorporating the improved backlighting arrangement of the aforesaid commonly assigned U.S. Pat. No. 5,161,041) is plotted on the abscissa.

FIG. 2A illustrates the distribution of light intensity directly in front of the daytime serpentine arrangement of lamps 2, depicted in FIG. 1, as "unenhanced" by an optical system (i.e., without image-splitting or diffusing elements). As can be easily discerned from FIG. 2A, unenhanced light emanating from the light source will inevitably lead to areas of localized high intensity of illumination on the array of liquid crystal pixels. In other words, local bright spots, such as "b," and local pale spots, such as "p," would be exhibited in the displayed image and, therefore, degrade image quality. In addition, the sharp cutoff of filter IRF would only truly exist at a viewing angle normal to the surface of the display. Furthermore, the loss of color integrity would increase in this respect, as one went to even modest viewing angles from normal.

Figure 2B:
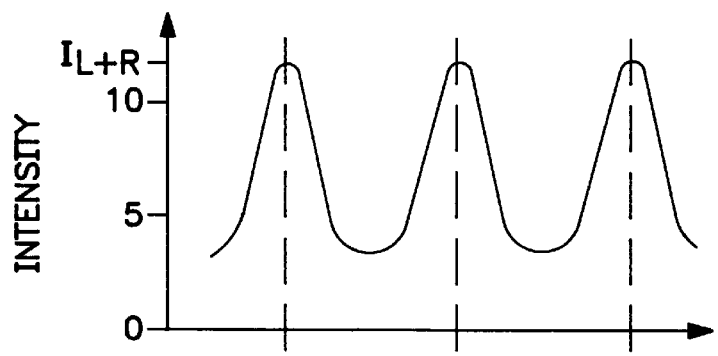
FIG. 2B is a graph of light intensity distribution in which the intensity of illumination is plotted on the ordinate, and the horizontal position across the viewing surface of an electronic display of the type illustrated in FIG. 1, including a reflector, is plotted on the abscissa.

FIG. 2B depicts the typical distribution of light intensity of the serpentine arrangement of daytime lamp 2 of FIG. 1 to which a back reflector is added. As can be seen, while the total light intensity is increased, local areas of bright spots and pale spots still exist.

Figure 2C:
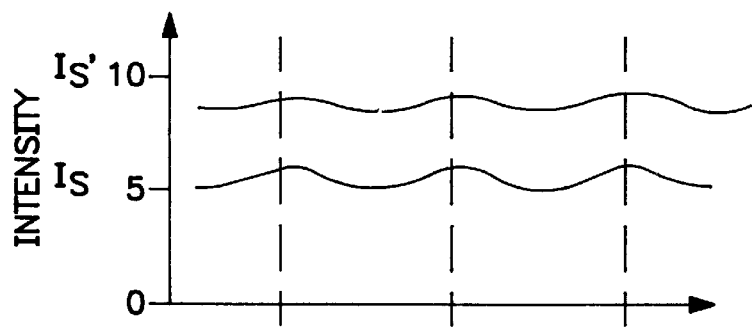
FIG. 2C is a graph of light intensity distribution in which the intensity of illumination is plotted on the ordinate and the horizontal position across the viewing surface of an electronic display is plotted on the abscissa, and illustrating by the curve $I_S$, a typical, known backlighting arrangement, and by curve $I_S'$, the improved backlighting arrangement of the aforesaid commonly assigned U.S. Pat. No. 5,161,041.

The curve marked as $I_S$ in FIG. 2C illustrates an intensity of illumination that can be expected from prior backlighting designs having a back reflector and a diffuser, but without the optics of the aforesaid patent (i.e. without an integral image splitting collimating lens). In the detailed description of the aforesaid patent (U.S. Pat. No. 5,161,041), a highly efficient optical system, including an integral image-splitting/collimating lens, is disclosed that maximizes light output while achieving a high degree of uniformity across the viewing screen. Curve $I_S'$ illustrates the uniform intensity of illumination achieved when the daytime serpentine light source is thus enhanced by the aforesaid integral lens. The image-splitting means of integral image splitting/ collimating lens 4 redistributes the intensity of radiation from the high intensity areas to the areas of lower intensity, while maintaining the total integrated light output from both the daytime and nighttime light sources 2 and 3 respectively as shown in FIG. 2C.

Preferred embodiments of the instant invention, like those of the aforesaid U.S. Pat. No. 5,161,041, incorporate two optical components, the image-splitting means and an optical collimating means, into a single, integral image-splitting/ collimating lens 4. The image-splitting lens 4 of the instant invention collimates light passing therethrough due to the presence of multi-faceted prisms formed on the exterior surface thereof. Specifically engineered facets of close tolerances on the integral lens 4 will not only achieve the desired optical effect of splitting the image, but will also collimate each image. Additionally, by positioning the legs of daytime lamp 2 and the facets of integral lens 4 both to extend horizontally (or substantially parallel to one another) with respect to the observer, collimation of the daytime light will be primarily in the vertical direction. This restricts the display emitted light to a vertical cone thereby reducing canopy glare and NVG saturation, as complained of by pilots. It is to be noted, however, that the present invention is fully operative when lens 4 incorporates image-splitting means only, without coupling such image splitting means with collimating means.

As reported in the aforesaid patent (U.S. Pat. No. 5,161, 041), it has been found that a material ideally suited for use as an integral image-splitting/collimating means is 3M SCOTCH™ Optical Lighting Film, which may be laminated onto a transparent supporting substrate, such as glass, other ceramic, or a synthetic plastic resin, and used as the integral image-splitting/collimating lens 4 in the LCD. The desired image-splitting effect, which is obtained with the 3M SCOTCH™ Optical Lighting Film, creates both daytime and nighttime uniform lighting by effectively filling in the pale spots corresponding to the spaces between the legs of lamp 2. This invention adopts such an embodiment as preferred.

By employing this integrally formed image-splitting/ collimating lens 4 between the matrix array panel of pixels 6 and the light sources, it is thus possible to achieve the desired optical effects without an increase in the profile of the display, as compared to other non-integrally formed optical systems. Indeed, since the distance between the two similar images provided by the image-splitting/collimating means 4 is a function of the operative spacing of integral lens 4 from both the daytime and nighttime light sources (i.e. the more distant the lens from a lamp, the farther apart the two images will appear), and because it is desired that the distance between the two images be controlled so that the two images are about immediately adjacent (i.e. contiguous) one another, it is possible, indeed desirable, to dispose the integral image-splitting/collimating lens 4 in close proximity to lamp 2 as will be discussed more fully below.

Optimal uniformity of both daytime and nighttime light emitted from the light sources of this embodiment is attained when the lower or interior surface of the substrate supporting the OLF material of the integral lens 4 is positioned a distance from the centers of the daytime light sources 2 substantially equal to the inner or emitting diameter $D_I$ of the daytime lamps 2. To obtain optical uniformity, it is also necessary to space the inner peripheries of adjacent daytime lamps a distance apart substantially equal to distance $D_I$ of the inner diameters defining the inner peripheries of the daytime lamps.

In addition, it has been found that nighttime EL light source 3 operates effectively without the use of a separate set of optical components, thereby maintaining the thin profile of the display device. As will be explained, however, a separate set of optical components, including an integral image-splitting/collimating lens and/or an infrared filter, may be supplied between the two light sources while still maintaining the thin profile of the display device.

As stated earlier, nighttime light source 3 in preferred embodiments of this invention is a flat EL panel which acts as both a daytime reflector of high intensity daytime light and as a nighttime emitter of low intensity nighttime light. In the preferred embodiment of the instant invention, this flat panel is a flat electroluminescent (EL) panel having a relatively low intensity output, e.g. 25 fL, but any other light source having equivalent capabilities may be employed. The EL panel, however, is not as efficient a reflector of light as conventional back reflectors. The efficiency of the EL panel as a reflector may be increased by the addition of a transparent reflective coating.

The integral image-splitting/collimating lens 4 will split the nighttime images of the EL light passing through the gaps between the tubes of daytime lamp 2 in a similar manner as the light from lamp 2, i.e. the image of the nighttime light passing between the legs of daytime fluorescent lamp 2 is split into two similar and substantially contiguous images. By positioning the integral image-splitting/collimating lens 4 as stated above and shown in FIGS. 1 and 10, the split images of the low intensity light of the EL panel are positioned substantially contiguous one to the other and, in fact, may overlap to some small extent. Therefore, the problem of the daytime light source blocking the light path of the nighttime light source underneath is eliminated without increasing the thickness of the LCD. The backlighting assembly of this embodiment is provided with a daytime reflector and separate night lamps without increasing the profile of the display.

Illumination of the EL panel 3 is achieved through conventional electrical excitation of a phosphor. Typically, the EL assembly consists of several layers, including a transparent electrode, the phosphor and top and bottom covers. Conventional phosphors are available to provide a white light, as well as a variety of colored light, including violet, bluegreen, green and yellow. Excitation of the phosphor is through electrical leads provided in the EL assembly. Power requirements are generally specified for 115 VAC 400 Hz operation, but may range above or below that specification, depending upon the application. DC operation is possible, however, a DC to AC converter is required. EL assemblies are available in thicknesses ranging from about 0.5 mm to 1.5 mm, and thereby contribute to the desired thinness of the display. In certain embodiments of the instant invention, the EL panel 3 may be switched on and the daytime fluorescent lamp 2 switched off by the use of a conventional manual switch (not shown). A conventional manual or automatic brightness control may also be incorporated in the instant invention. These switches are not shown for the purpose of convenience.

In a preferred embodiment of the present invention, nighttime light source 3 is a single flat EL panel such as the Perma-Light, white color panel manufactured by Quantex Corporation of Rockville, Md. The EL panel 3 supplies a white light with an intensity at the face of display device 1 of approximately 1.0 to 1.5 fL. By using conventional circuitry within the skill of the artisan, this nighttime intensity can be dimmed down to, for example, as low as 0.05 fL or less, if desired. The single EL panel 3 has the advantage of having a single pair of electrical leads. Alternative configurations to the EL panel such as a series of separate thin panels corresponding to the spaces between the legs of the daytime lamp 2 or a single panel having several fingers corresponding to the spaces between the legs of lamp 2 could be employed.

Returning now to FIG. 1, diffuser 5 of known and conventional design is provided to scatter the collimated light provided by the integral lens 104 so that it will illuminate liquid crystal display panel 6 in all direct ions and provide acceptable off-axis (wide angle) viewing (e.g. 0°–30° and preferably about 60° or more). However, due to the high h degree o f uniformity of light provided by the integral image-splitting/collimating lens 4 it is not necessary to diffuse the light to the extent necessary in prior art backlight assemblies, and thus the profile of backlight assembly 1 is further reduced.

While conventional diffusers made from, for instance, a roughened polymer sheet, are preferably employed in the instant embodiment, holographic diffusers or directional non-holographic diffusers may instead be employed. The benefit of holographic or directional non-holographic diffusers is to provide some control over the direction of diffusion, thereby preventing loss of light at particular angles.

Backlight assembly 1 further includes in conventional fashion daytime lamp and nighttime EL panel control electronics (not shown) having provisions for lamp starting and dimming circuitry, preferably in ballast 7.

Figure 3:
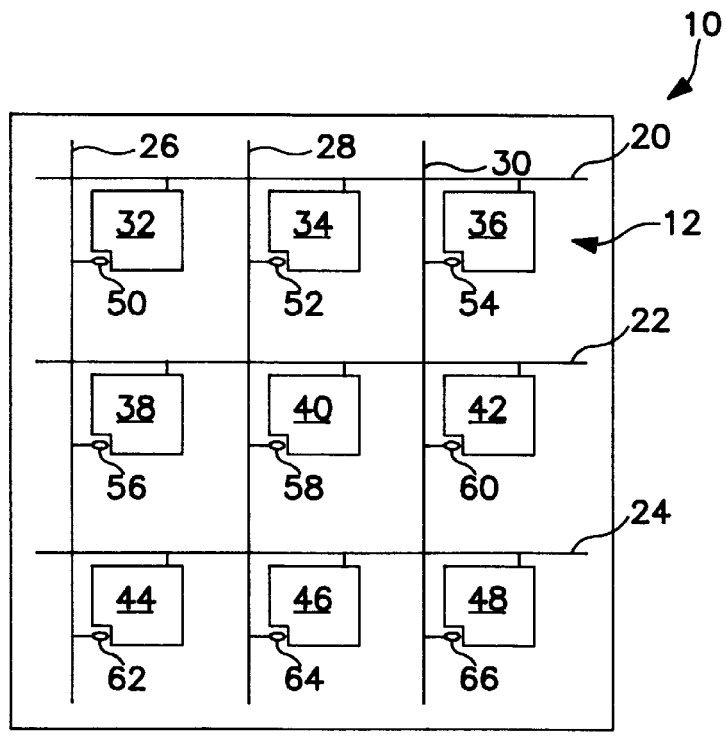
FIG. 3 is a stylistic front elevational view of the matrix array of rows and columns of liquid crystal picture elements of the active matrix embodiment of the electronic color display of the instant invention, schematically illustrating the manner in which the threshold switching elements are operatively disposed between the address lines and one of the picture element electrodes.

Referring now to FIG. 3, there is depicted therein a typical matrix array of rows and columns of discrete liquid crystal display picture elements, said matrix array being generally designated by the reference numeral 10. Each liquid crystal display picture element or pixel 12 includes two spacedly disposed pixel electrode plates with a light-influencing material, such as a liquid crystal composition, operatively captured therebetween. (The electrode plates and the light-influencing material will be discussed in detail with respect to FIG. 4). Each of pixels 12 further includes a threshold switching device or a plurality of threshold switching devices for selectively applying an electric field across the liquid crystal composition when the electric field exceeds a predetermined threshold value.

More specifically, matrix array 10, which defines liquid crystal display 6 of the instant invention, includes a first set of X address lines 20, 22 and 24; a second set of Y address lines 26, 28 and 30; and a plurality of liquid crystal picture elements 32, 34, 36, 38, 40, 42, 44, 46, and 48. The display further includes at least one isolation or addressing element 50, 52, 54, 56, 58, 60, 62, 64, and 66, operatively associated with and electrically connected to each respective picture element. As should be readily apparent to the reader from even a cursory review of FIG. 3, X address lines 20, 22 and 24 and Y address lines 26, 28 and 30 cross over one another at an angle, so as to define a plurality of spaced crossover points associated with respective liquid crystal picture elements 32–48. Picture elements 32–48 are formed on a transparent substrate, such as glass, and are distributed thereover in spacedly disposed relation, so as to define interstitial spaces therebetween.

Figure 4:
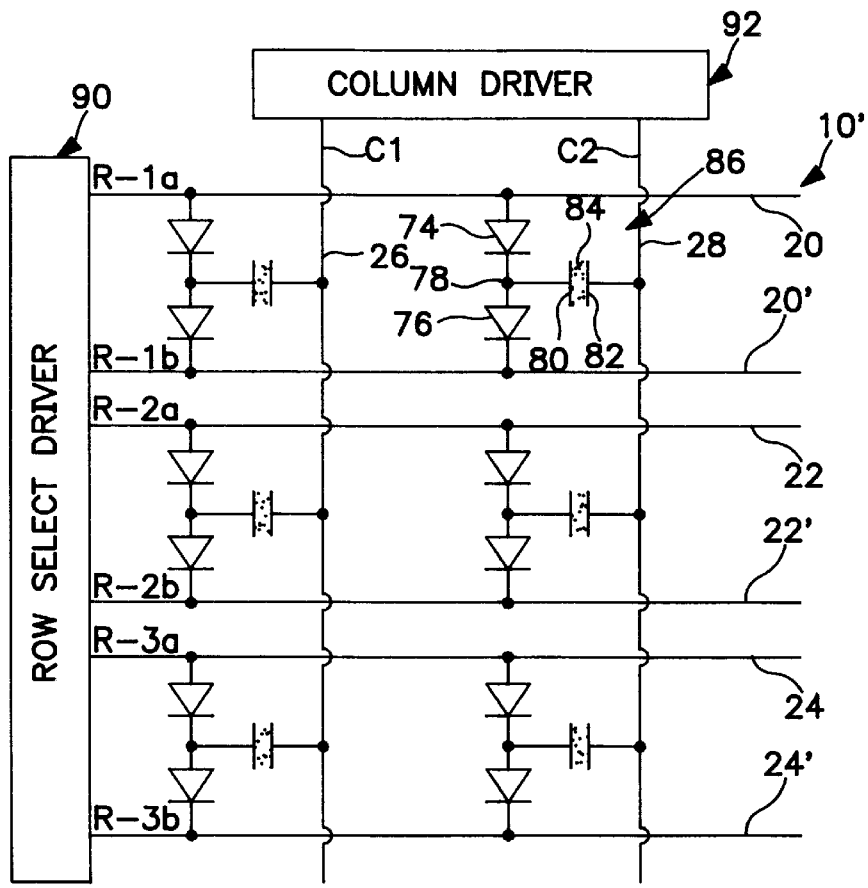
FIG. 4 is an equivalent circuit diagram of the active matrix embodiment of the array of FIG. 3, illustrating the relationship between the liquid crystal picture elements and the anode-to-cathode connected diodes, by which individual ones of the picture elements, schematically depicted in FIG. 3, are addressed.

As can be ascertained from a perusal of FIGS. 3 and 4, each of threshold devices 50–66 is shown to be diodes. It is to be recognized, however, that other types of bi-directional switching devices, e.g., field effect transistors (TFT, thin film transistors), may be utilized to equal advantage. While diodes are preferably coupled in non-opposing series relation with a first one of the pixel electrodes, other types of switching elements may employ different electrical interconnections. The diode type of switching arrangement will now be described in greater detail, with respect to FIG. 4.

In FIG. 4, matrix array 10' includes a plurality of substantially parallel address line pairs 20, 20', 22, 22', 24, and 24', which are the row select lines, and a plurality of substantially parallel column address lines 26 and 28. Column address lines 26, 28 and 30 cross row select address line pairs at an angle and are spaced from row select address line pairs to form a plurality of crossover points therewith. Preferably, column address lines cross row select line pairs at an angle which is substantially perpendicular thereto.

Since, as mentioned hereinabove, each of the pixels are identical, only pixel 12 will be described in detail in the following paragraphs. Pixel 12, as can be seen from the figures, includes a pair of threshold devices 74 and 76 which are electrically coupled together at common node 78. Threshold devices 74 and 76 are shown as diodes in this embodiment, and are electrically coupled together in non-opposing series relationship between row select address line pair 20 and 20'. Although threshold devices 74 and 76, in accordance with certain embodiments of the invention are diodes, the devices can be of any type which provide a high impedance to current flow when reverse-biased, and a comparatively low impedance to current flow when forward-biased. Therefore, any bi-directional threshold switch or field effect transistor (e.g. TFT; thin film transistor or MIM, metal-insulator-metal transistor) can be utilized with equal advantage. Of course, more conventional electrical interconnections would be employed with field effect transistors. The switching devices are preferably formed from deposited layers of semiconductor material such as, by way of example and not of limitation, amorphous silicon alloy.

Picture element or pixel 12 further includes a pair of electrode plates 80 and 82 which are spaced apart and facing one another. Operatively disposed in the space between electrode plates 80 and 82 is light-influencing material 84. The term "light-influencing material" is defined, and will be used herein, to include any material which emits light or can be used to selectively vary the intensity, phase or polarization of light either being reflected from or transmitted through the material. In accordance with the preferred embodiment of the invention, light-influencing material 84 is a liquid crystal display material, such as a twisted (TN) nematic liquid crystal material. In any event, electrode plates 80 and 82, with liquid crystal material 84 disposed therebetween, form storage element 86 (or capacitor) in which electric charge can be stored. As illustrated, storage element 86 is coupled between common node 78, formed by electrically connected threshold devices 74 and 76, and column address line 28.

Still referring to FIG. 4, matrix array 10' further includes row select driver 90 having outputs R-1*a*, R-1*b*, R-2*a*, R-2*b*, R-3*a*, and R-3*b* electrically coupled to row select line pairs 20, 20', 22, 22', 24 and 24'. Row select driver 90 provides drive signals at the outputs thereof to apply first operating potentials which are substantially equal in magnitude and opposite in polarity between the row select address line pairs to forward bias the threshold devices 74 and 76 to, in turn, facilitate the storage of electric charge in the storage elements coupled thereto. The row select driver also applies second operating potentials which are substantially equal in magnitude and opposite in polarity between the row select address line pairs to reverse bias the threshold devices to facilitate the retention of the electric charge stored in the storage elements coupled thereto.

Lastly, matrix array 10' includes column driver 92. Column driver 92 includes a plurality of outputs C1 and C2 which are coupled to column address lines 26 and 28, respectively. Column driver 92 is adapted to apply a charging potential to selected ones of column address lines for providing electric charge to be stored in selected storage elements during the application of the first operating potentials to the row select address line pairs by row select driver 90.

In the embodiment of the matrix array of rows and columns of picture elements that combine to make up the improved matrix array 10', described above, a "balanced drive" scheme for addressing each discrete one of the pixels is preferred. In this driving scheme, the operating potentials applied to the row select address line pairs are always substantially equal but opposite in polarity. Assuming that the current-voltage characteristics of each of the diodes are substantially equal, a voltage of substantially zero volts will be maintained at common node 78, at least when the diodes are forward-biased. Thus, the voltage applied on column address line 28 to charge storage element 86 no longer needs to take into account the voltage drop across and/or parasitic charge build-up on one or both of threshold devices 74 and 76. Therefore, each pixel in the matrix array of rows and columns may be charged to a known and repeatable value, regardless of its position in that matrix array. This permits improved gray scale operation resulting in at least 15 levels of gray scale in large area active matrix displays of the twisted nematic liquid crystal type using normal fluorescent back illumination. The pixels can also be charged more rapidly, since the retained charge in the diodes associated with each pixel, when they are reverse-biased, need not be initially dissipated to charge the storage elements. This is because this charge is dissipated when the diodes are first forward-biased. A complete description of this driving scheme can be found in U.S. Pat. No. 4,731,610, issued Mar. 15, 1988 to Yair Baron et al. and entitled "Balanced Drive Electronic Matrix System and Method of Operating the Same", the disclosure of which is incorporated herein by reference.

Figure 5:
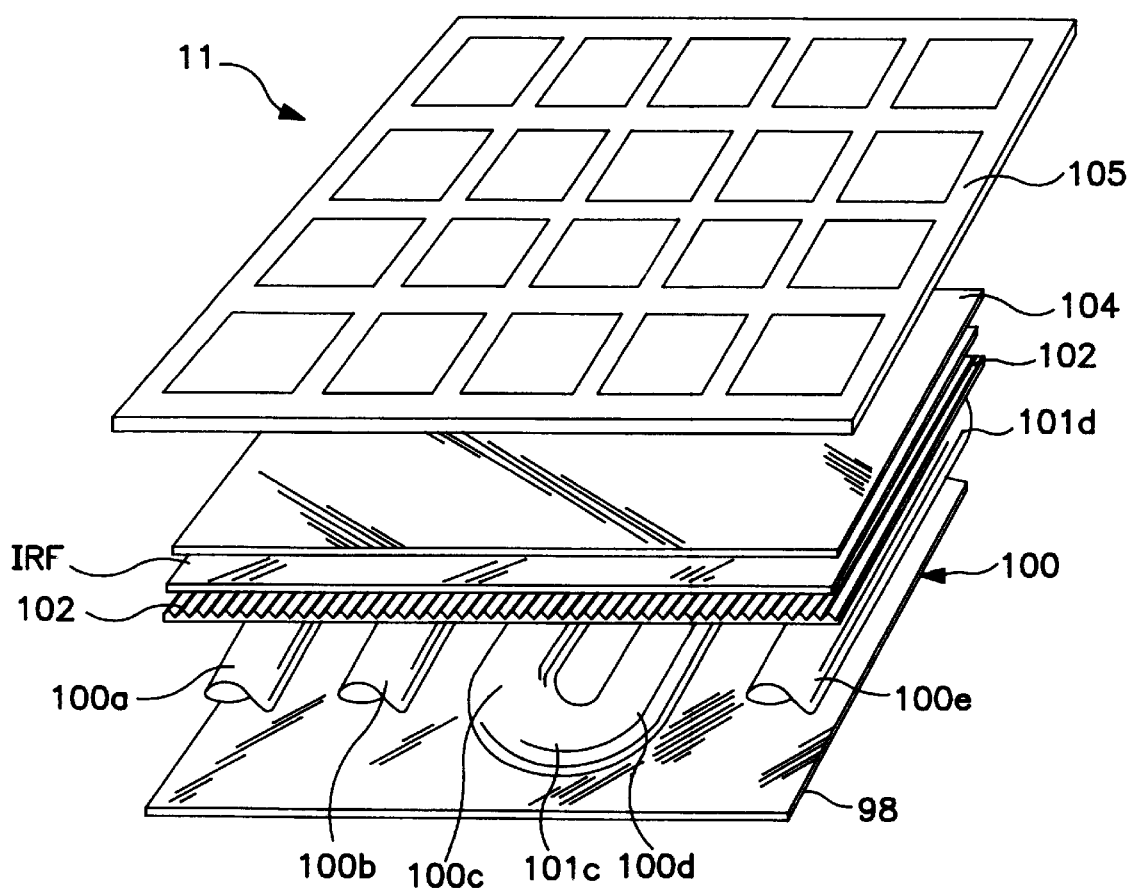
FIG. 5 is a fragmentary perspective view illustrating the relative disposition of certain elements of the embodiment of FIG. 1.

Turning now to FIG. 5, there is depicted in a fragmentary perspective view of the first embodiment of the instant invention. Elements 98, 100, 102, IRF, 104, and 105 of FIG. 5 correspond and are equivalent to elements 3, 2, 4, IRF, 5, and 6 respectively of FIG. 1. In this first embodiment, integral image-splitting/collimating lens 102 and infrared filter IRF are operatively disposed so as to provide for low profile electronic display assembly 11. The infrared filter IRF is disposed between the diffuser 104 and the integral lens 102, while the daytime light source 100 is positioned between the nighttime EL source 98 and the integral lens 102.

Achieving a low profile or depth dimension of the display is important to the preferred embodiments of this invention. It is dependent on the type of lighting assembly, the material from which the threshold devices are fabricated, the on-board electronics, the multiplexing schemes, and most importantly, the optical arrangement by which light is refracted, diffused and transmitted to the viewing audience. In most instances, as envisioned herein, the depth dimension of "LCD thickness" is maintained below about 2 inches, and preferably at about 1 to 1.5 inches due especially to the fact that the EL night light source 98 functions as both a daytime reflector and nighttime emitter of light.

There are six (6) basic optical elements which are included in the electronic display assembly 11 of the first embodiment depicted in FIG. 5. The uppermost (closest to a viewer of the display) element is the generally rectangularly shaped matrix array 105 upon which the rows and columns of active matrix liquid crystal picture elements or pixels, as well as the associated drive circuitry described in the preceding paragraphs, are disposed. The lowermost element is the thin, generally rectangularly shaped back panel 98 upon the surface of which is a thin sheet of electroluminescent (EL) material. An EL material supplying a white light with an intensity of approximately 25 fL is preferred. The EL material operates as a nighttime emitter of light, and as a daytime reflector of light emitted from daytime source 100. Disposed immediately above EL panel 98 is an array of daytime light sources 100 (such as a continuous bent fluorescent tube) from which radiation emanates and either passes directly towards the matrix array of picture elements 105 or is reflected off the reflective EL panel and then passes upwardly toward matrix array 105.

Next, integral image-splitting/collimating lens 102, as described in the aforesaid patent, is operatively located between the array of light sources 100 and the matrix array of picture elements 105. Thereafter, infrared filter IRF is disposed, followed by diffuser 104. Specifically, the infrared filter IRF and the diffuser 104 are disposed between the integral lens 102 and the display panel 105 with the diffuser 104 being closest to the display panel 105. It is the combination of these optical elements which defines the profile, preferably the low profile, of the electronic display of the instant invention.

More specifically, it is important to note that lighting is one of the critical parameters which is employed in assessing the visual appearance of a liquid crystal display. Not only is it essential that the image of the display appear clear and bright to the viewers at the normal angle thereof, but it is also important that the image be substantially clear to viewers disposed at an angle relative to the normal viewing angle of the viewing screen of the display. The structural and optical relationship existing between the array of light sources and the integral image-splitting/collimating means 102 to a large extent determines the clarity and viewing angle of the display.

In the first embodiment of the invention illustrated in FIG. 5, the array of daytime light sources 100 is configured as one elongated, serpentined fluorescent lamp arranged in a specific pattern or lighting configuration, with each section of lamp disposed in a generally horizontal plane. More specifically, the array, regardless of configuration, will be arranged to uniformly distribute radiation emanating therefrom over the entire surface area of the matrix of rows and columns of picture element panel 105. To this end, the daytime light array 100 is preferably shaped in a serpentine pattern which may include a plurality of elongated lamps, such as 100*a*, 100*b*, 100*d*, and 100*e*, each lamp of which has a longitudinal axis substantially parallel to the longitudinal axes of the other major lamp sections.

The length of each longitudinal lamp axis may be selected to be generally co-extensive with the length dimension of the matrix array of picture elements. The configuration of lighting array 100 also includes curved end sections, such as 100*c*. The number of the elongated axial sections of the lamps and the number of the curved end sections of the lamps must be sufficient to bathe the entire width dimension of the matrix array of picture elements 105 with a uniform shower of illumination. EL nighttime light panel 98 is configured, preferably, to be of substantially the same edge-to-edge dimensions, i.e. co-extensive with, the edges of light source 100. As explained above, light source 100 may be configured in several different ways to equal advantage. Use of a square helical arrangement would, however, preferably require that two image-splitting means arranged with the grooves positioned substantially perpendicular to each other be employed to provide the desired optical effects explained above.

Image-splitting/collimating lens 102 is formed as an integral unit. The integrally formed image-splitting/collimating lens 102 is, as discussed hereinabove, preferably fabricated of 3M SCOTCH™ Optical Lighting Film which is laminated onto a transparent substrate, such as glass, a ceramic or plastic. By employing this integrally formed image-splitting/collimating lens, it is thus possible to achieve two desired optical effects, image-splitting and collimation, without an increase in the profile of the display. Indeed, since the distance between the two similar images provided by the image-splitting/collimating lens is controlled by the operative spacing of the lens from a light source (i.e. the more distant lens 102 from the light source, the farther apart the two images appear) and since it is desired that the distance between the two images be controlled so that the two images are substantially immediately adjacent (i.e. contiguous) one another, it is possible, indeed desirable, to dispose the image-splitting/collimating lens in close proximity to light source 100. Therefore, in the preferred embodiments of this invention, image-splitting/collimating lens 102 is spaced from light source 100 to provide two images about immediately adjacent (i.e. contiguous) one another. As is illustrated in FIG. 5, the image-splitting/collimating lens 102 is also preferably used in conjunction with diffuser 104 to further enhance the uniformity of the light emanating from both the daytime and nighttime light sources 100 and 98 respectively. In the instant invention, filter IRF is preferably between lens 102 and diffuser 104, so that infrared filter IRF receives, to the extent possible, collimated light to achieve the purposes of this invention.

Figure 6:
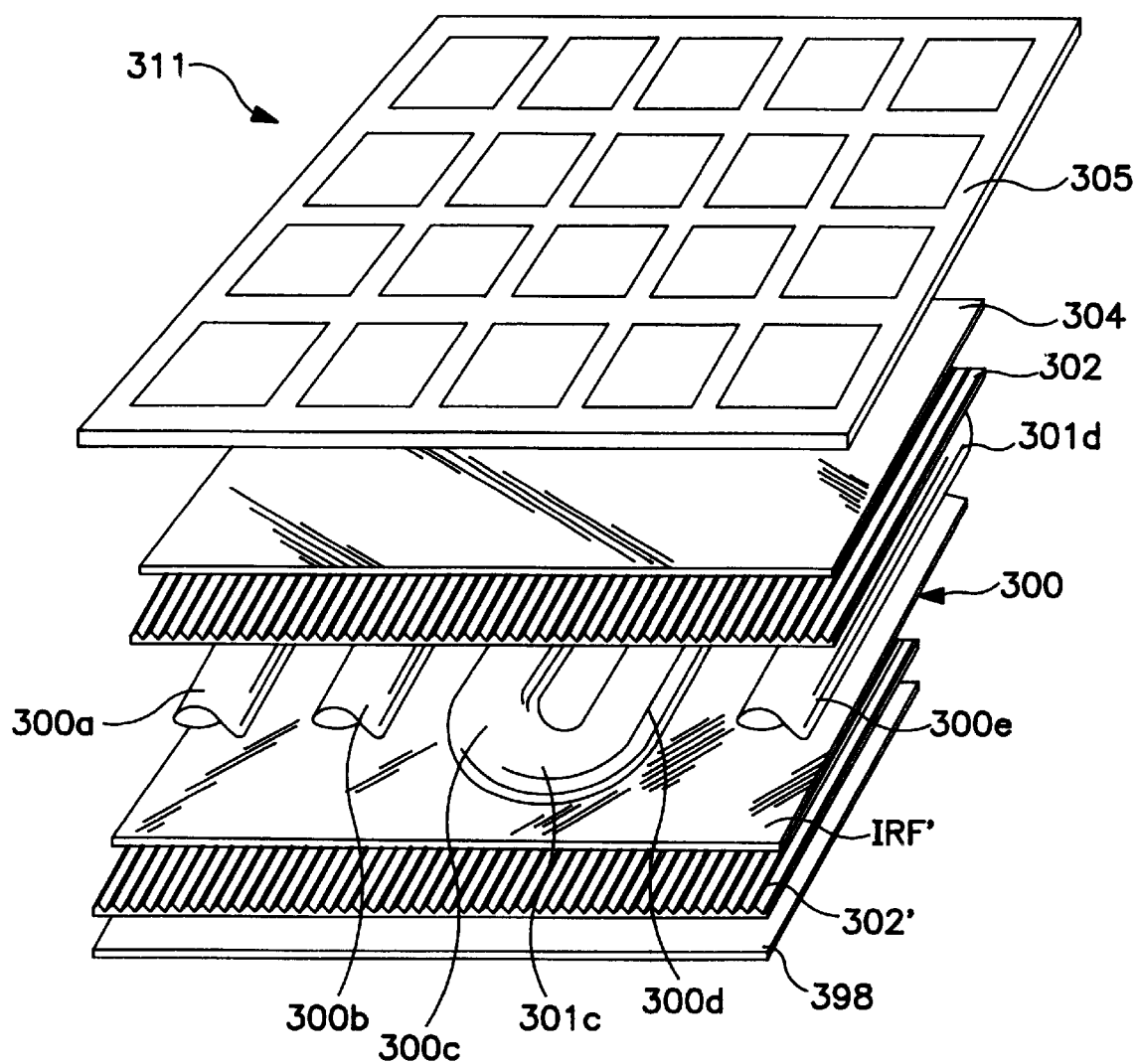
FIG. 6 is a fragmentary perspective view, illustrating the relative disposition of the elements of another embodiment of an LCD stack of the instant invention, which employs the optional, additional NVG filter and image-splitting/collimating lens.

A second embodiment of the present invention is depicted in FIG. 6. This second embodiment is substantially similar to the embodiment depicted in FIG. 5 but includes a second image-splitting/collimating lens 302', and the infrared filter IRF' is repositioned within the LCD stack. The stack includes from the viewer backward, in addition to the matrix array of rows and columns of picture elements 305, the diffuser 304, a first image-splitting/collimating lens 302, daytime fluorescent serpentine lamp 300, infrared filter IRF', a second image-splitting/collimating lens 302', and finally the nighttime EL source 398.

Infrared filter IRF' in this embodiment is positioned between the daytime light source 300 and the second integral image-splitting/collimating lens 302' as depicted in FIG. 6, su as to filter only the nighttime backlight, since the purpose of the infrared filter is to improve the performance of the display at nighttime when NVG's are used.

The second integral image-splitting/collimating lens 302' is added to the LCD in this embodiment to provide collimated light to the infrared filter IRF'. Lens 302' is positioned with its faceted prism grooves extending horizontally with respect to the viewer to collimate light mostly in the vertical direction. By so restricting the vertical viewing angles, nighttime canopy reflections are reduced or eliminated. The facet prisms grooves of the first and second integral lenses 302 and 302' are substantially parallel with one another. The first integral image-splitting/collimating lens 302 is retained to provide necessary optical characteristics during daytime operation and is disposed between the diffuser 304 and the daytime lamp 300.

Figure 7:
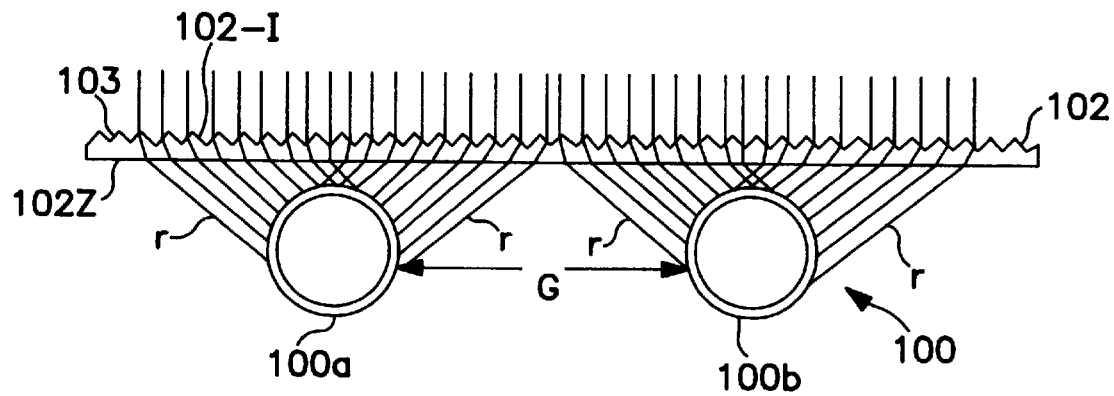
FIGS. 7, 8 and 9 are fragmentary cross-sectional views of the embodiment shown in FIG. 5, illustrating the manner in which rays of light, emanating from the axially aligned lighting configuration of FIG. 5, are split and collimated by the optical media of the image-splitting/collimating lens array and, thereafter, in FIG. 9, are transmitted (or absorbed) by the IR filter as employed in the instant invention.
Figure 8:
Figure 8:
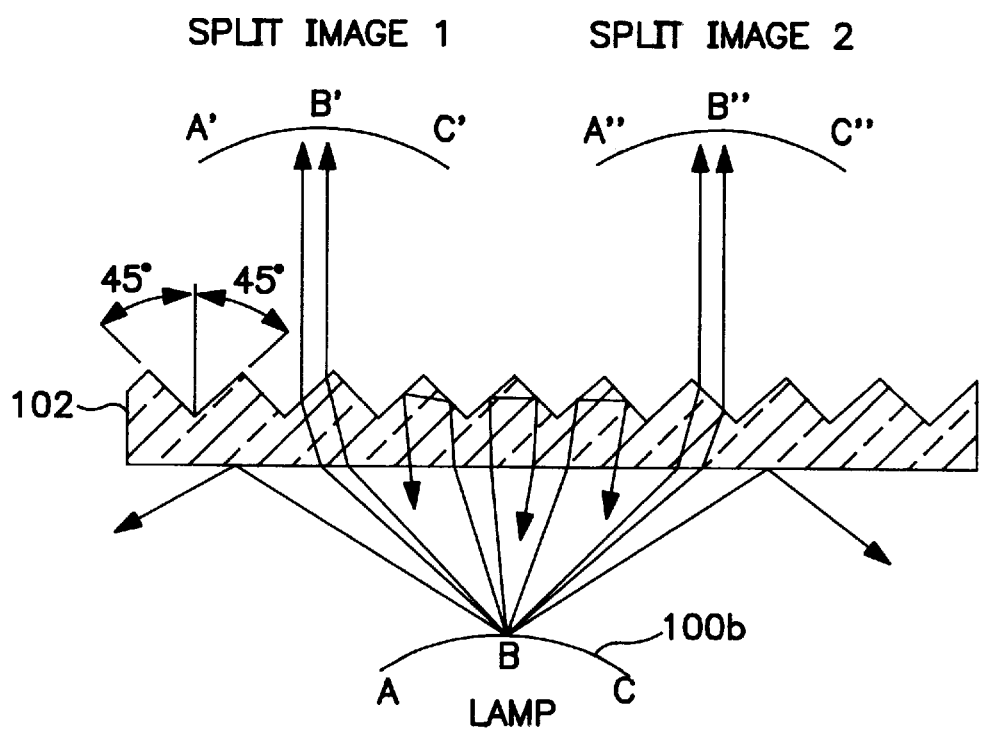

Turning now to FIGS. 7 and 8, there is depicted therein a cross-sectional view provided to demonstrate the manner in which rays of light "r" emanating from daytime lamps 100b and 100a of lighting configuration 100 (or 300) are collimated to present a sharp image to the viewing audience of the liquid crystal display of the instant invention. More particularly, there is depicted in FIG. 7 two lamp segments 100a and 100b, of the embodiment of the daytime light configuration, wherein the longitudinal axes thereof are disposed in substantially parallel alignment. As can be seen from a perusal of FIG. 7, rays of light "r", emanating from the two parallel but spacedly disposed daytime lamps, are directed upwardly through the image-splitting/collimating lens 102. The upper surface, the surface opposite light source 100, of image-splitting/collimating lens 102, is engineered so as to comprise a series of aligned substantially 45°, multi-faceted prisms 103. Prisms 103 are aligned such that the longitudinal extents thereof are substantially parallel to the longitudinal extents of substantially parallel lamps 100a, 100b. At both planar air-to-material interface 102Z and faceted material-to-air interface 102I thereof, the rays of light are collimated and transmitted in collimated fashion.

FIG. 8 is presented to schematically illustrate how the above-referenced aligned facets of prisms 103 inherently operate to provide the image-splitting effect. This, of course, also illustrates the inherent characteristics of operation of the aforesaid 3M SCOTCH™ Optical Lighting Film when used in this invention. As illustrated with reference to a segmented arc of lamp 100b having mid-point B and extremities A and C (these points being designated for convenience of illustration, it being understood that lamp 100b is a circular tube), certain rays of light are reflected backwardly while others are allowed to exit in collimated fashion from integral image-splitting/collimating lens 102. To the observer located at "eye", this inherently results in a "split image" 1 and 2, the spacing of which, as aforesaid, is governed by the distance between lamp 100c and lens 102. In this way, uniformity, as well as collimated light, is achieved.

Figure 9:
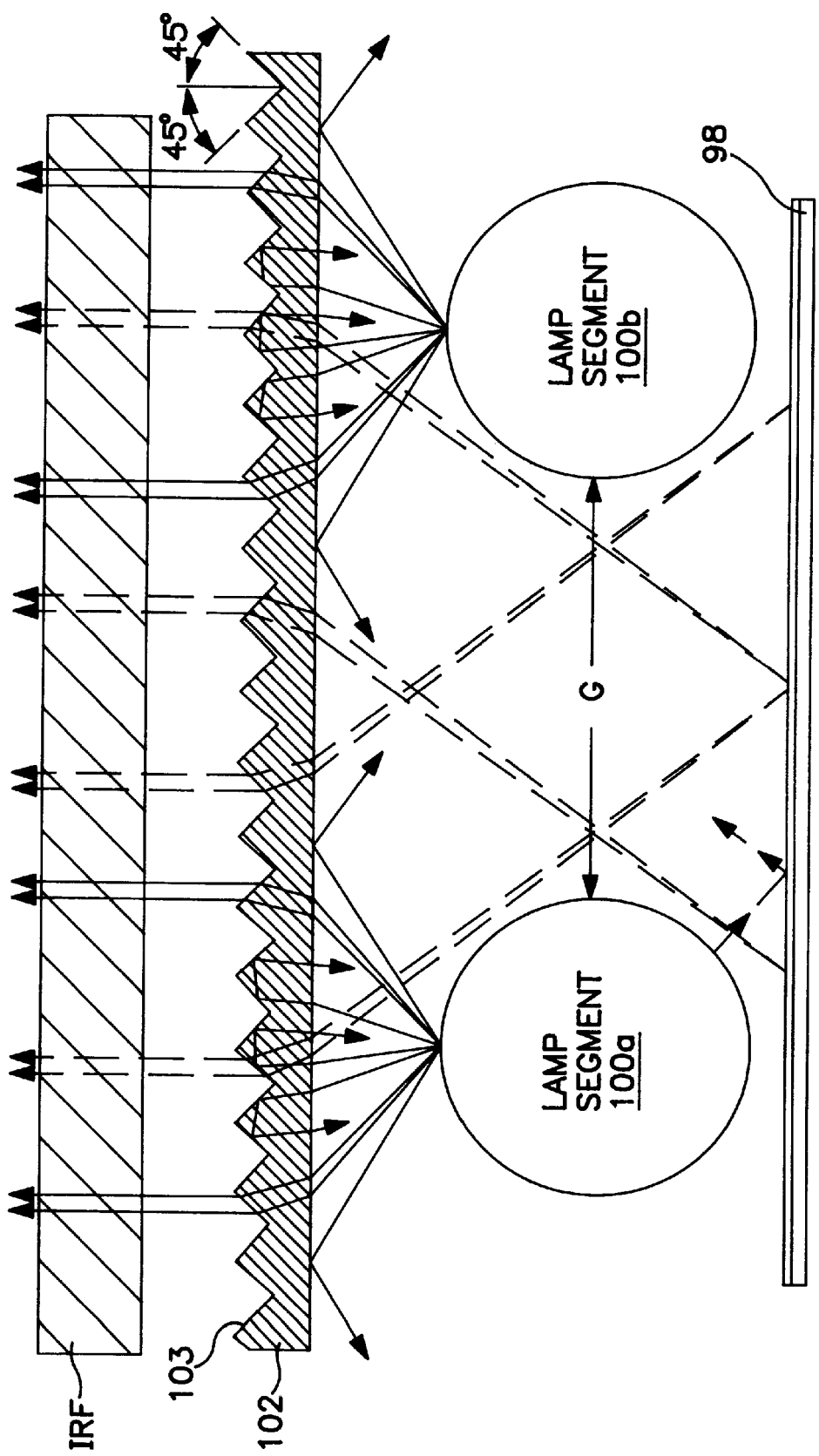

The importance of this is illustrated in FIG. 9. As illustrated, by using integral collimating/image-splitting lens 102 properly located above (on the side closest a viewer) elongated and parallel lamps 100a and 100b to create substantially contiguous images, substantial uniformity of illumination is achieved. In addition, by sending to the infrared filter IRF collimated light uniformly across its surface, not only is virtually all infrared light absorbed (i.e. virtually none transmitted to matrix array 10), but color integrity is maintained, and by use thereafter of diffuser 104, the viewing angle problem inherent to sharp cutoff infrared filter IRF is overcome at all reasonable viewing angles (e.g. 0–30° and preferably 0–60° normal to the surface of panel 10). FIG. 9 also illustrates the ability of EL panel 98 to operate as a daytime reflector of light, thereby providing enhanced brightness during daytime operation while simultaneously providing the LCD with nightlamps, a reflector, and a thin profile.

Figure 10:
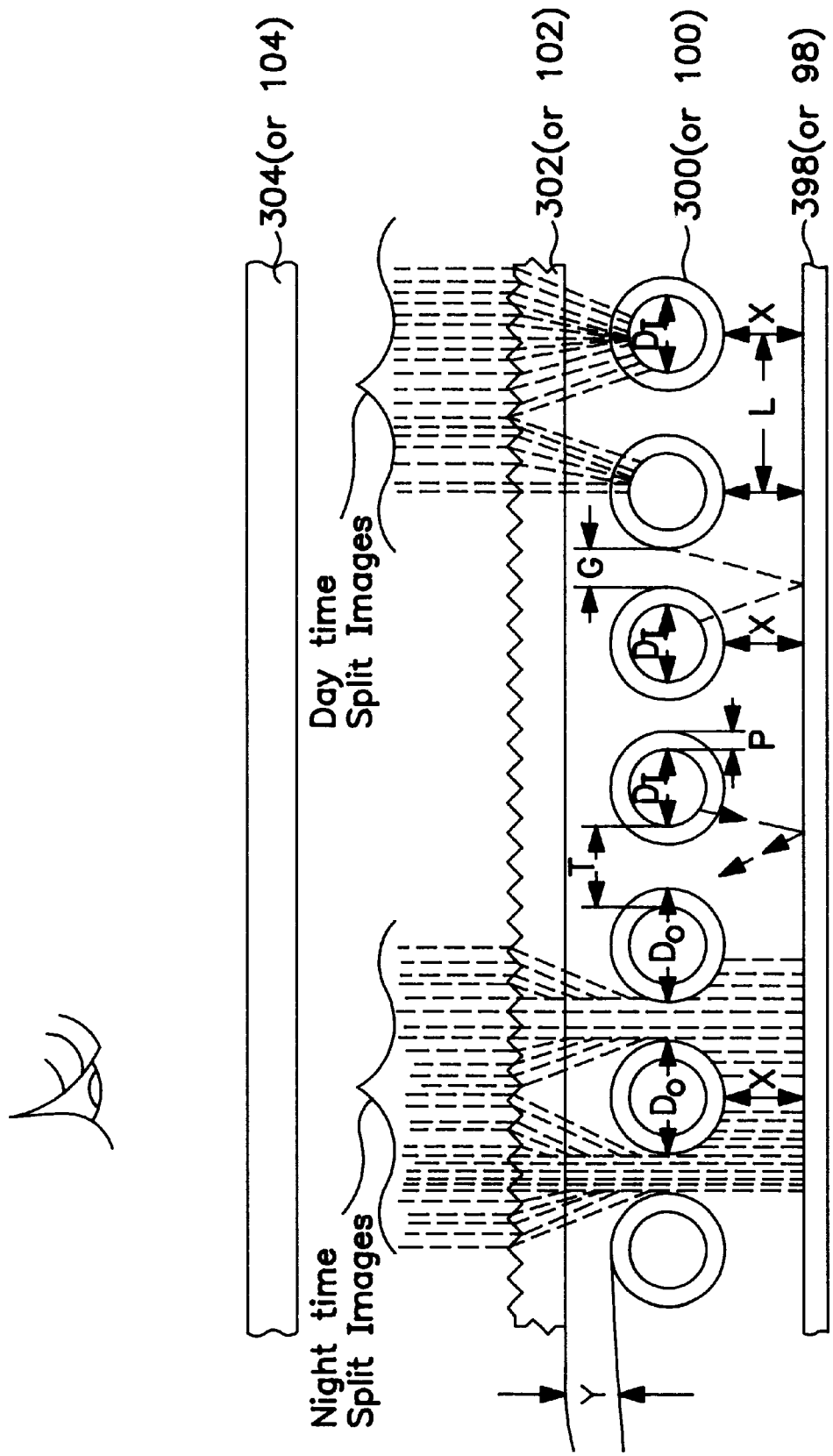
FIG. 10 is a cross-sectional view of the embodiment shown in FIG. 5, illustrating the manner in which rays of light, emanating from both the daytime and nighttime light sources, are similarly split and collimated by the optical media of the image-splitting/collimating lens array.

FIG. 10 illustrates the manner in which light emanating from both nighttime EL panel 398 and the daytime source 300 is split and collimated in a similar manner to present a sharp image to the viewing audience of the LCD of the first embodiment of the instant invention. It is apparent from a comparison of FIG. 10 with FIGS. 7, 8 and 9, that light emanating from EL panel 398 is split and collimated in substantially the same way as the light emanating from fluorescent lamp segments 100a and 100b.

As shown in FIG. 10, by the proper positioning of integral image-splitting/collimating lens 302, two similar substantially contiguous images emanating from both the EL night lamp 398 and the serpentine daytime lamp 300 are provided. In this respect, the integral image-splitting/collimating lens 302 is disposed between the diffuser 304 and the daytime light sources 300 and is spaced from the daytime sources 300 such that when light is emitted from the high intensity sources 300, similar images thereof are formed by the integral image-splitting lens 302 and are cojoined (e.g. contiguous so as to touch, but not to overlap so much as to create substantially large bright spots). By so locating lens 302, there is thus created a substantially uniform generation of light for impingement upon the rear side of the matrix array of pixel elements. Furthermore, the integral lens 302 is positioned and disposed relative to the nighttime light source 398 such that when low intensity light is emitted from the nighttime source, the split-images thereof formed by the integral image-splitting lens 302 are substantially cojoined (as aforesaid) to thereby create a substantially uniform generation of nighttime light for impingement upon the rear side of the matrix array.

The spacing between the parallel daytime light sources 300 is an important parameter to the achievement of substantially uniform light in this embodiment. Each tubular or elongated daytime light source (e.g. 300a) has an inner diameter $D_I$ and an outer diameter $D_O$, wherein the inner or light emitting diameter $D_I$ defines the diameter within the confines of the inner periphery of each daytime light source. The inner diameter thus defines the light emitting portion of each daytime bulb 300. The outer diameter $D_O$ of each bulb 300 is indicative of the diameter of the outer periphery of each light source 300. The inner and outer diameters $D_I$ and $D_O$ are different from one another due to the thickness "P" of the glass making up the daytime light sources 300. The inner diameter $D_I$ of each elongated daytime light source in an example of this embodiment is about 5.5 mm and the outer diameter $D_O$ of each daytime light source is about 7.0 mm. In other words, the thickness "P" of the glass utilized in the daytime light sources is about 0.75 mm. Such dimensions are merely exemplary. It is possible, for example, to utilize daytime lamps with inner diameters $D_I$ as large as about 13 mm, if desired. Selecting the size of the daytime bulbs will, of course, then affect the appropriate selection of the relative positions of the other elements to ensure the achievement of uniform illumination.

Turning now to the positioning of the daytime light sources 300 relative to the nighttime light source 398 and to one another, the inner peripheries of the daytime light sources 300 are spaced from one another a distance "T" which defines the gap between the inner peripheries of adjacent daytime light sources. Preferably, the distance or gap "T" is substantially equal to the distance or value of the inner diameters $D_I$ of the daytime sources 300, or about 5.5 mm in certain embodiments of this invention. In other words, the gap "T" between the inner peripheries of adjacent daytime light sources 300 is substantially equal to the inner diameter defining the inner periphery of each daytime light source 300. By manufacturing the backlighting system so that parameters "$D_I$" and "T" are substantially equal to one another, the result is a backlighting system which splits the images of both the daytime and nighttime light and cojoins the split-images substantially contiguous to one another as they propagate toward the matrix array panel of pixels. Substantially uniform illumination is thereby achieved.

Another dimension of the embodiment illustrated in FIG. 10 which must not be ignored, is the disposition of the daytime light sources 300 relative to both the integral image-splitting/collimating lens 302 and the low intensity EL light source 398. In this respect, the outer peripheries of the daytime light sources 300 are preferably spaced from the interior or lower surface 340 of the substrate of the integral lens 302 by a distance "Y". The distance "Y" between the outer peripheries of the daytime lamps 300 and the integral lens 302 in this embodiment having daytime lamps of the above noted dimensions is preferably about 1.5–2.0 mm in the aforesaid example of this embodiment. Therefore, proportionally speaking, the distance between the inner peripheries of the daytime lamps 300 and the interior or lower surface 340 of the integral lens 302 is about ½ $D_I$. Furthermore, the EL nighttime light source 398 is located at a position to the interior of or below the daytime light sources 300 thereby defining a space "X" therebetween. The distance "X" between the outer peripheries of the daytime light sources 300 and the EL lamp 398 is preferably about 3–3.5 mm in certain embodiments when the daytime lamps have inner diameters $D_I$ of about 5.5 mm. In other words, the distance "X" between the daytime and nighttime light sources is equal to about ½ $D_O$.

As further shown in FIG. 10, the outer peripheries of adjacent daytime lamps 300 are spaced from one another a distance "G" defining a space through which light emanating from the EL lamp 398 directly propagates. The distance "G" in this embodiment (i.e. when $D_I$=5.5 mm; and $D_O$=7.0 mm) is preferably about 4 mm.

The aforesaid numerical values assigned the parameters of this embodiment are merely illustrative and should be viewed relative to one another proportionally in understanding this invention. For example, while the numerical values of the parameters may change, the gap "T" between the inner peripheries of adjacent daytime lamps 300 should always be substantially equal to the value $D_I$ defining the inner diameters of the daytime sources 300, and the distance "Y" should always be substantially equal to about ⅓ of the inner diameter $D_I$ of the daytime sources 300. Also, the distance "L" between the center lines of adjacent daytime sources 300 should be maintained at about twice the value of the inner diameter $D_I$ of the daytime sources.

Because of the reflecting nature of the nighttime EL light source 398 and the location of the integral lens 302, the position of the EL source 398 a distance "X" away from the outer peripheries of the daytime sources 300 results in the light emitted from the nighttime source 398 proceeding through the gap "T" between the inner diameters of adjacent daytime sources 300 and being split into two substantially contiguous images by the integral image-splitting lens 302. The portion of the light emitted from the nighttime source 398 which does not proceed through the gaps "T" between the daytime sources 300 is substantially blocked by these same sources. As can be seen in FIG. 10, the light from both the daytime and nighttime sources 300 and 398 respectively is optically effected in a similar manner by the integral lens 302 due to the proper positioning of the optical elements. Because of the disposition of these elements relative to one another as described above, both the daytime and nighttime light are split into two substantially contiguous images by the integral image-splitting and collimating lens 302 and are directed upward therefrom through the optional diffuser 304 and into the matrix array panel of pixels.

Another distinct advantage of this invention is that in certain embodiments of this invention a backlighting system for an LCD may be provided with both an integral image-splitting/collimating lens and a separate and independent nighttime light source without increasing the thickness or profile of the backlighting system. This is because the EL night source 398 (or 98) acts as both a daytime reflector and a nighttime light emitter. This is a significant improvement over the prior art because in many liquid crystal display applications, the depth or profile of a display, including the backlighting system, is critical in determining whether specific LCDs can be used in certain locations.

Once given the above disclosure, many other features, modifications and improvements will become apparent to the skilled artisan. Such other features, modifications and improvements are therefore considered a part of this invention, the scope of which is to be determined by the following claims.

I claim:

1. In a liquid crystal display which includes a matrix array of rows and columns of liquid crystal picture elements, said matrix array having a viewing side and a rear side, and wherein said display further includes means for generating light to be passed through said matrix array which includes a first light source and a second light source, said first and second light sources being located rearward of said rear side of said matrix array thereby to create a pair of backlit light sources for said array, said means for generating light further including means for selecting from which light source said light shall be emitted, the improvement comprising:

as said first light source, at least two, spaced apart light emitting members of substantially the same size so as to define a gap therebetween, said two spaced apart light emitting members each having an inner diameter defining an inner periphery and an outer diameter defining an outer periphery thereof, wherein said gap is defined as the distance between said inner peripheries of said two spaced apart light emitting members, said gap being of substantially the same width as each of said inner diameters of said spaced apart light emitting members;

wherein said second light source is located rearward of said first light source with respect to said matrix array, and is further so located with respect to said first light source such that a substantial portion of the light emitted from said second light source directly projects into and through said gap between the inner peripheries of said two spaced apart light emitting members of said first light source;

and wherein said display further includes image-splitting means for providing two, similar images of one of said first and second light sources when said one light source emits light therefrom, said image-splitting means being located between said matrix array and said light sources and being spaced from said light sources such that when said first light source emits light the split, similar images thereof formed by said image-splitting means are cojoined to create a substantially uniform generation of light for impingement upon the rear side of the matrix array, and such that when said second light source emits light, the split-images thereof formed by said image-splitting means are cojoined to create a substantially uniform generation of light for impingement upon the rear side of said matrix array.

2. The display of claim 1, wherein the color integrity of the displayed image is maintained throughout a viewing angle of about 0°–30° from normal.

3. The display of claim 2, wherein said viewing angle is about 0°–60° from normal.

4. The display of claim 1, having an RGB-triad color pattern, wherein the display is a full-color, substantially uniformly lit AMLCD having NVIS-B NVG compatibility, and which exhibits red color coordinate integrity at viewing angles up to about 60° from normal to the display surface.

5. The display of claim 4, which when tested according to MIL-L-85762A standard for color displays with 0.5 fL intensity, generally exhibits throughout the display an NRb of less than or equal to about 2.2E-09, with slightly higher numbers at the normal angle, and somewhat smaller numbers at large viewing angles.

6. The display of claim 1, further comprising a second image-splitting means located between said first light source and said second light source for providing split-images of said light emitted from said second light source as it proceeds through said gap between said light emitting members of said first light source.

7. In a liquid crystal display which includes a matrix array of rows and columns of liquid crystal picture elements, said matrix array having a viewing side and a rear side, and wherein said display further includes means for generating light to be passed through said matrix array which includes a first light source and a second light source, said first and second light sources being located rearward of said rear side of said matrix array thereby to create a pair of backlit light sources for said array, said means for generating light further including means for selecting from which light source said light shall be emitted, the improvement comprising:

as said first light source, at least two, spaced apart light emitting members of substantially the same size so as to define a gap therebetween, said two spaced apart light emitting members each having an inner diameter defining an inner periphery and an outer diameter defining an outer periphery thereof, wherein said gap is defined as the distance between said inner peripheries of said two spaced apart light emitting members, said gap being of substantially the same width as each of said inner diameters of said spaced apart light emitting members;

wherein said second light source is located rearward of said first light source with respect to said matrix array, and is further so located with respect to said first light source such that a substantial portion of the light emitted from said second light source directly projects into and through said gap between the inner peripheries of said two spaced apart light emitting members of said first light source;

and wherein said display further includes image-splitting means for providing two, similar images of one of said first and second light sources when said one light source emits light therefrom, said image-splitting means being located between said matrix array and said light sources and being spaced from said light sources such that when said first light source emits light the split, similar images thereof formed by said image-splitting means are cojoined to create a substantially uniform generation of light for impingement upon the rear side of the matrix array, and such that when said second light source emits light, the split-images thereof formed by said image-splitting means are cojoined to create a substantially uniform generation of light for impingement upon the rear side of said matrix array; and wherein, said second light source is an EL panel which acts as a reflector of light emitted from the first light source thereby creating a display with said first and second light sources without an increased overall profile, and wherein said upper or exterior surface of said EL panel is disposed a distance "X" from the outer peripheries of said first light source, said distance "X" being equal to about $(0.55-0.70) \cdot I_D$ where $I_D$ is the inner diameter of said first light source members.

8. A backlit liquid crystal display comprising:

a matrix array of rows and columns of liquid crystal pixels, said matrix array having a viewer side and a rear side;

a backlight for generating light to be passed through said matrix array, said backlight including a first light source and a second light source wherein said first and second light sources are disposed rearward of said rear side of said matrix array so as to create a pair of backlight sources for said matrix array;

selecting means for determining from which of said first and second light sources said light shall be emitted;

said first light source including at least two spaced apart elongated light emitting members defining a gap therebetween, each of said light emitting members having an inner diameter defining an inner periphery and an outer diameter defining an outer periphery;

wherein said second light source includes an EL panel disposed rearward of said first light source with respect to said matrix array, said second light source acting as a reflector of light emitted from said first light source thereby creating a thin-profile display, the EL panel reflecting light emitted from said first light source back toward said matrix array through said gap and wherein light emitted from said EL panel is also projected through said gap and toward said matrix array of pixels;

said EL panel is disposed a distance "X" from the outer periphery of said first light source, said distance "X" being equal to about $(0.55-0.70) \cdot I_D$ where $I_D$ is the inner diameter of said first light source; and image-splitting means for providing two similar images of one of said first and second light sources when said one light source emits light therefrom, said image-splitting means being disposed between said matrix array and said first light source such that when light is emitted from said backlight a substantially uniform blanket of light impinges upon the rear side of said matrix array.

* * * * *